(12) United States Patent
Gehrmann

(10) Patent No.: US 7,216,231 B2
(45) Date of Patent: May 8, 2007

(54) METHOD AND SYSTEM FOR ESTABLISHING A WIRELESS COMMUNICATION LINK

(75) Inventor: Christian Gehrmann, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 465 days.

(21) Appl. No.: 10/467,511

(22) PCT Filed: Feb. 7, 2002

(86) PCT No.: PCT/EP02/01330

§ 371 (c)(1),
(2), (4) Date: Feb. 2, 2004

(87) PCT Pub. No.: WO02/073874

PCT Pub. Date: Sep. 19, 2002

(65) Prior Publication Data

US 2004/0128509 A1 Jul. 1, 2004

Related U.S. Application Data

(60) Provisional application No. 60/269,331, filed on Feb. 20, 2001.

(30) Foreign Application Priority Data

Feb. 16, 2001 (EP) .................................. 01610011

(51) Int. Cl.
*G06F 17/60* (2006.01)

(52) U.S. Cl. ...................... 713/171; 713/150; 713/156; 713/168; 713/173; 713/176; 713/189; 380/270; 380/277

(58) Field of Classification Search ................ 713/150, 713/156, 168–171, 173, 176, 189; 380/270, 380/277, 278–279
See application file for complete search history.

(56) References Cited

U.S. PATENT DOCUMENTS 5,825,300 A 10/1998 Bathrick et al.

(Continued)

FOREIGN PATENT DOCUMENTS

WO 99/41876 A1 8/1999

OTHER PUBLICATIONS

Juha T. Vainio, "Bluetooth Security", Online! May 25, 2000, pp. 1-12, XPO00221441.

(Continued)

*Primary Examiner*—Taghi T. Arani
(74) *Attorney, Agent, or Firm*—Potomac Patent Group PLLC

(57) ABSTRACT

A method of establishing a secure communications link between a user communications device and a first service communications device; the method comprises the steps of initiating a communications link using a first communications protocol between the user communications device and the first service communications device; performing, based on a PIN value, an initialisation procedure between the user communications device and the first service communications device, the initialisation procedure resulting in an identification key; storing the identification key in the user communications device and the first service communications device; the method is characterised in that it further comprises the steps of using a second communications protocol to perform a transaction between the user communications device and a second service communications device; generating and storing the PIN value; the invention further relates to a communications system and a mobile communications device.

6 Claims, 6 Drawing Sheets

U.S. PATENT DOCUMENTS 5,926,546 A * 7/1999 Maeda et al. .................. 705/65
5,987,129 A * 11/1999 Baba .......................... 380/279
6,772,331 B1 * 8/2004 Hind et al. .................. 713/151

OTHER PUBLICATIONS

Senthil Sengodan, et al., "On End-to-End Security For Bluetooth/WAP & TCP/IP Networks", 2000 IEEE International Conference on Personal Wireless Communications, Conferences Proceedings (CAT. No.00TH8488), Proceedings of IEEE International Conference on Personal Wireless Communications (ICPWC), Hyderabad, India, Dec. 17-20, 2000, pp. 399-403, XP010534082, 2000, Piscataway, NJ USA, IEEE, USA, ISBN: 0-7803-5893-7.

"Specifications Of The Bluetooth System", Wireless Connections Made Easy; Core V1.OB, Online!, vol. 1, Dec. 1, 1999, pp. 1, 149-178, XP002175286.

International Search Report dated Feb. 13, 2003.

* cited by examiner

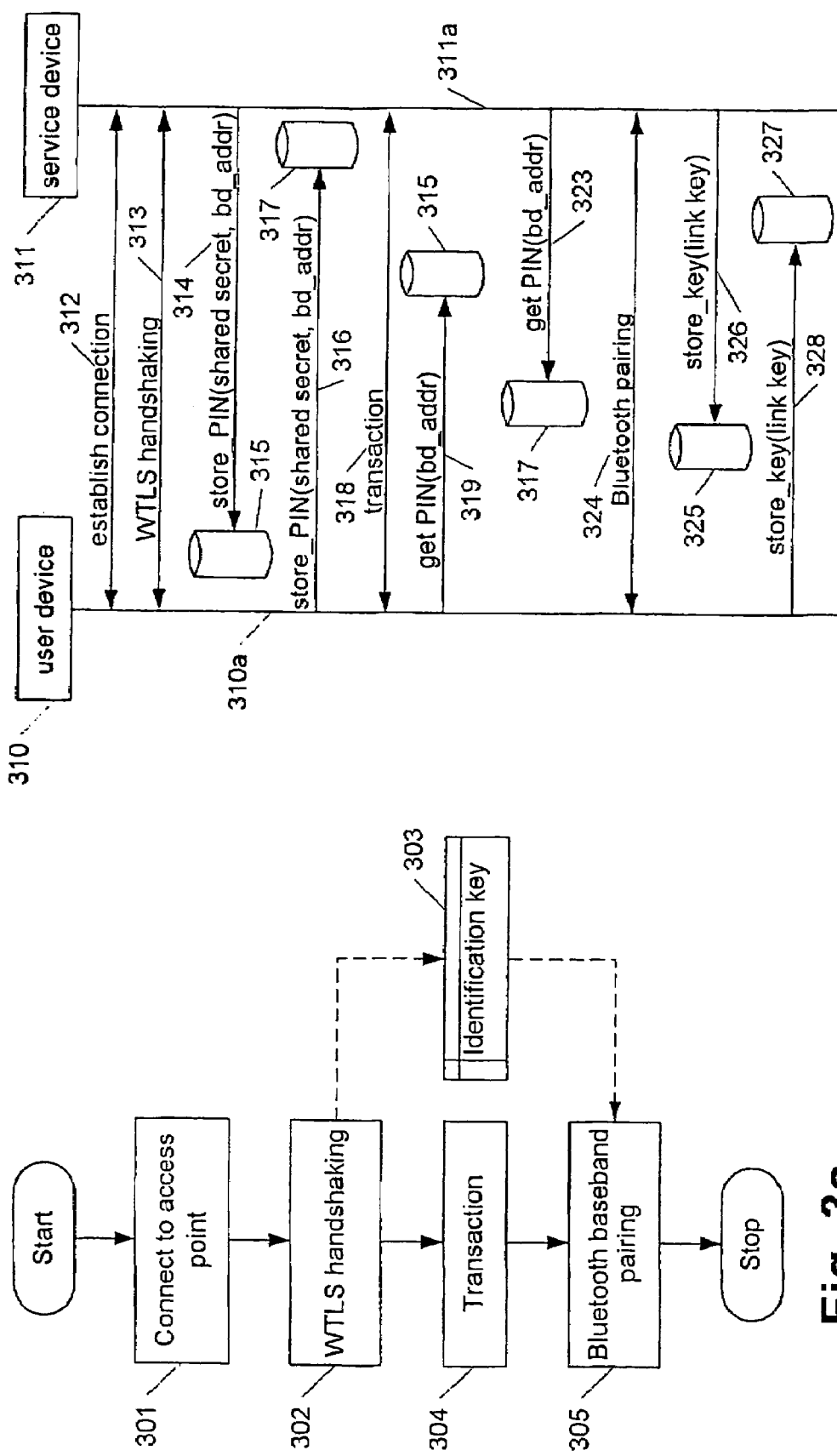

METHOD AND SYSTEM FOR ESTABLISHING A WIRELESS COMMUNICATION LINK

CROSS REFERENCE TO RELATED APPLICATIONS

This application claims the benefit of U.S. Provisional Application No. 60/269,331, filed Feb. 20, 2001, which is hereby incorporated herein by reference in its entirety.

FIELD OF THE INVENTION

This invention relates to a method of establishing a wireless communications link between a user communications device and a service communications device.

BACKGROUND OF THE INVENTION

Wireless communications technologies are frequently used for a wide variety of applications, such as remote controls, wireless network connections of computers, e-commerce applications or the like. In many applications it is desired to establish a secure communications link between two communications devices. This may for example be desired in order to minimise the risk of unauthorised use or misuse or the risk of unauthorised retrieval of information transmitted via the communications link. Hence, effective authentication and encryption schemes are desired in order to mutually authenticate the devices participating in a communication, and to be able to encrypt the information transmitted via a communications link.

An example of a wireless communications technology is the Wireless Application Protocol (WAP), which enables mobile communications devices to access the Internet. The WAP protocol is a layered protocol with a wireless datagram protocol (WDP) as the lowest layer, layered on top of a network layer and a bearer service which provide the wireless data link between a WAP client and a WAP server. Examples of bearer services include CDPD in an analogue cellular system, SMS and GPRS in a GSM cellular system, Bluetooth, one-way and two-way paging.

The Bluetooth technology is an example of a short-range wireless communications technology. The Bluetooth technology enables different units to communicate at a high speed and may be used in a variety of applications including ad-hoc networks of computers and other electronic equipment, e-commerce applications where a portable electronic user communications device may be used as an electronic ticket or key. The user communications device, e.g. a mobile phone, may connect to a service communications device which may grant or deny access to a location or a service.

In many of these applications there is a need for a fast authentication of the user communications device by the service communications device, in particular when the time necessary for the completion of an interaction between the user device and a service device should be kept as small as possible.

The Bluetooth standard (see "Specification of the Bluetooth system, Wireless connections made easy", core version 1.0B, 1999, at http://www.Bluetooth.com) describes how to create security associations between Bluetooth units, how to authenticate units and how to encrypt Bluetooth links. Authentication and encryption are based on security keys generated by one or both of the units and exchanged during an initial pairing or initialisation procedure. However, the unit authentication and link encryption mechanisms require that the two communicating units have been paired, i.e. that an initialisation procedure has been performed and that they share a common secret link key. The pairing is performed based on a PIN value.

The Bluetooth specification suggests that the user may manually enter the PIN into the two devices. However, in order to achieve high security during the subsequent sessions the PIN value should be long as it is used as a basis for the generation of the secret link key. Consequently, this solution has the problem that the manual entering of a long PIN code is time consuming, and errors are likely to occur.

Alternatively, the Bluetooth specification suggests that the PIN value may be exchanged between two devices through means supported by software on the application layer, e.g. by a Diffie-Hellman key agreement. However, the Bluetooth specification does not indicate how this may be done. Furthermore, it is a problem of this prior art solution that a Diffie-Hellman key agreement alone does not provide sufficiently high security, especially for e-commerce applications, or other applications which require the exchange of sensitive data.

For the WAP protocol a standardised security protocol called Wireless Transport Layer Security (WTLS) has been described (see "Wireless Transport Layer Security (WTLS)" WAP forum, http://www.wapforum.org). The WTLS protocol may be used to create secure connections between a WAP client, e.g. a mobile telephone, and a WAP server, e.g. a WAP service provider.

Another known security solution for many secure transport applications in the Internet is the Transport Layer Security (TLS) solution (see T. Dierks and C. Allen, "The TLS Protocol Version 1.0", IETF RFC 2246, ftp://ftp.isi.edu/in-notes/rfc2246.txt). The goal of the TLS protocol is to provide privacy and data integrity between two communicating applications. The TLS protocol is composed of two layers which my be layered on top of a reliable transport layer, such as TCP.

However, it is a disadvantage of these prior art methods that using the higher level security functions during communication requires an implementation of a WTLS or TLS server in the communicating Bluetooth units. This would imply additional storage and memory requirements.

It is a further disadvantage of these prior art methods that setting up a higher level communication, such as a WSP or http session with WTLS or TLS, between a client and a server takes a long time. This time may exceed the time available for an e-commerce interaction.

It is a further disadvantage of these prior art methods that they require a bearer protocol that supports WTLS or TLS, such as IP, to be available between the two Bluetooth units.

Hence, it is an object of the invention to provide a method and a system for a fast, efficient set-up of secure connections between wireless communication units.

SUMMARY OF THE INVENTION

This and other objects are achieved when a method of establishing a secure communications link between a user communications device and a first service communications device, the method comprising the steps of exchanging a first identification key via a first communications protocol between the user communications device and a selected one of the first service communications device and a second service communications device;

generating, based on the first identification key, a second identification key for use during subsequent communications sessions between the user communications device and the first service communications device via a second communications protocol;

storing the second identification key in a first storage means of the user communications device and in a second storage means of the first service communications device;

is characterised in that the method further comprises the step of authenticating the first communications protocol using a pre-configured trust relation between the user communications device and the corresponding first or second service communications device.

According to the invention, the second identification key is generated on the basis of a first identification key which, in turn, is provided as a result of an authenticated key exchange protocol. The authentication of the key exchange protocol is based on a pre-configured trust relation between the user communications device and the corresponding first or second service communications device. Examples of such trust relations include a shared secret, a certificate, a public key, etc. The authentication of the key exchange protocol provides sufficient security even for sensitive e-commerce applications, without requiring a cumbersome manual input of a lengthy PIN code. The key exchange may be part of a transaction, e.g. an initialisation procedure such as a handshake operation, between the user communications device and the first service communications device. Alternatively, the key exchange may be performed with a second communications device, e.g. a dedicated subscription device or a remote network server.

Consequently, it is possible to generate and exchange a long first identification key, thereby increasing the security related to the second identification key which is based upon the first identification key. At the same time, the key exchange is performed in a fast and efficient manner without the need for manually inputting a key code, such as a PIN. It is a further advantage of the invention that, in subsequent communications sessions, a secure link may be established based upon the second identification key without the need for time-consuming communication via the first protocol.

Consequently, the method according to the invention results in a second identification key which may be used in subsequent communications sessions between the user communications device and the first service communications device, e.g. for unit authentication, encryption or the like. The establishment of a secure communications link comprises the initial establishment of a connection and an initialisation procedure including the generation of an identification key which may be used for authentication and encryption.

It is an advantage of the invention that the first communications protocol is only needed during the initial session when generating the first identification key. If the identification key is transferred to other service communications devices, the identification key may also be used for setting up secure connections between the user communications device and the other service communications devices.

The first storage means may for example be a physical memory, such as a RAM, in the user communications device or a, possibly dynamically, allocated part of the memory of a processing unit of the user communications device.

Other examples of storage means are storage media such as a hard disk, a SIM card, or the like. Likewise, the second storage means may be a memory or storage medium in the first service communications device or a memory or storage medium which the first service communications device has access to, e.g. via a computer network.

In a preferred embodiment of the invention the second communications protocol is a Bluetooth baseband protocol;

the second identification key is a Bluetooth link key; and the step of generating the second identification key comprises the steps of performing a baseband pairing of respective Bluetooth baseband layers of the user communications device and the first service communications device; and generating a Bluetooth initialisation key on the basis of the first identification key.

It is an advantage of the invention that it provides an efficient and fast method of setting up a secure connection between two Bluetooth units.

In another embodiment, the second identification key may be generated as part of another initialisation procedure of the second communications protocol between the user communications device and the first service communications device.

Alternatively, the step of generating the second identification key on the basis of the first identification key may comprise the step of using the first identification key directly as the second identification key, e.g. as the Bluetooth link key, thereby avoiding an additional initialisation procedure.

The first and second communications protocols may be implemented on top of any suitable communications channel, including a wireless communications link, e.g. radio-based, infrared or the like.

In a further preferred embodiment of the invention the second communications protocol is a lower-layer protocol than the first communications protocol with respect to a layered communications model.

When the first communications protocol is selected from the class of protocols comprising TLS and WTLS, existing protocols and their respective security mechanisms may be utilised. Examples of such security mechanisms include WTLS in connection with WAP and TLS in connection with IP. Alternatively or additionally, other suitable communications protocols may be used.

It is a further advantage of the invention that it allows utilisation of already existing security functions of portable user communications devices, such as mobile phones, PDAs and laptops.

In an advantageous embodiment of the invention the step of authenticating the first communications protocol comprises a handshake operation, and the first identification key is derived from a shared secret established during the handshake operation. It is an advantage of this embodiment that existing key generation and key exchange functions may be adopted, thereby providing a particularly efficient way of exchanging the first identification code with little overhead. The shared secret may for example be the shared secret of a WTLS or a TLS security protocol.

The user communications device, the first and the second service communications devices may be any electronic equipment or part of such electronic equipment, where the term electronic equipment includes computers, such as stationary and portable PCs, Bluetooth. access points, stationary and portable radio communications equipment. The term portable radio communications equipment includes mobile stations such as mobile telephones, pagers, communicators, i.e. electronic organisers, smart phones, PDAs, or the like.

In a preferred embodiment of the invention, the second service communications device is a server computer of a communications network, e.g. a personal computer, a work station, a server of a service provider, or the like.

In another preferred embodiment of the invention the step of exchanging the first identification key further comprises the steps of establishing a communications link between the user communications device and the second service communications device, and generating and storing in a third storage means of the user communications device an identification code related to the first identification key;

the method further comprises the step of communicating the first identification key and the identification code from the second service communications device to the first service communications device; and the step of generating the second identification key further comprises the steps of transmitting the identification code from the first service communications device to the user communications device, and, on the basis of the identification code, retrieving the first identification key from the first storage means.

It is an advantage of this embodiment that the communications session comprising the initial key exchange via the first protocol may utilise a different communications link than the second protocol, and that the key exchange may be performed between the user communications device and a second service communications device, which may be different from the first service communications device. Hence, a user may subscribe to a service and obtain a corresponding identification key in a separate communications session, e.g. a communications session with a remote server of the service provider. The identification key may subsequently be used to initialise a secure communications link with the first service communications device. In order to identify the stored first identification key in the subsequent session, an identification code is generated and stored together with the identification key. The third storage means may be a separate memory or storage medium or it may be the same as the first storage means.

It is a further advantage of the invention that no application layer security mechanism, such as WTLS or TLS, or the corresponding bearer protocol, such as WAP or IP, is required in connection with the second communications link.

In a preferred embodiment of the invention the communications link uses a protocol selected from the class of protocols comprising TCP/IP and WAP.

When the method further comprises the step of performing a subscription transaction via the first communications protocol, the exchange of the first identification key may be performed during a subscription session to a service, which may comprise a transaction such as a payment, the transmission of credit card information, the receipt of e-tickets, a PIN number or the like, and thus may require a secure connection.

The invention further relates to a communications system comprising a user communications device and a first service communications device, the user communications device including first communications means adapted to communicate via a first communications protocol with a selected one of the first service communications device and a second service communications device;

first processing means adapted to exchange a first identification key with the corresponding first or second service communications device;

the user communications device and the first service communications device including respective second and third communications means adapted to communicate via a second communications protocol; and respective second and third processing means adapted to generate, based on the first identification key, a second identification key for use during subsequent communications sessions between the user communications device and the first service communications device via the second communications protocol; and respective first and second storage means adapted to store the second identification key.

The communications system is characterised in that the user communications device further comprises fourth processing means adapted to authenticate the first communications protocol using a pre-configured trust relation between the user communications device and the corresponding first or second service communications device.

The term processing means comprises general- or special-purpose programmable microprocessors, Digital Signal Processors (DSP), Application Specific Integrated Circuits (ASIC), Programmable Logic Arrays (PLA), Field Programmable Gate Arrays (FPGA), etc., or a combination thereof. The processing means may be a CPU of a computer, a microprocessor, a smart card, a SIM card, or the like.

The term communications means comprises circuitry and/or devices suitable for enabling the communication of data between the user communications device and the first or second service communications device and /or between the first and second service communications devices, e.g. via a wired or a wireless data link. Examples of such communications means include a network interface, a network card, a radio transmitter/receiver, a cable modem, a telephone modem, an Integrated Services Digital Network (ISDN) adapter, a Digital Subscriber Line (DSL) adapter, a satellite transceiver, an Ethernet adapter, or the like. For example, the user communications device may be connected to the first or second service communications device via a short range wireless communications link using electromagnetic signals, such as infrared light, e.g. via an IrDa port, radio-based communications, e.g. via Bluetooth transceivers, or the like. Alternatively, the user communications device may be adapted to establish a connection with the second service communications device via a radio interface for connecting it to a wireless telecommunications network, such as a Cellular Digital Packet Data (CDPD) network, a Global System for Mobile (GSM) network, a Code Division Multiple Access (CDMA) network, a Time Division Multiple Access Network (TDMA), a General Packet Radio service (GPRS) network, a Third Generation network, such as a UMTS network, or the like.

In a preferred embodiment of the invention the user communications device is a mobile station, where the term mobile station comprises mobile telephones, pagers, communicators, i.e. electronic organisers, smart phones, PDAs, and the like.

As the advantages of the communications system according to the invention and its preferred embodiments correspond to the advantages of the method and its corresponding embodiments described above and in the following, these will not be described again.

The invention further relates to a mobile communications device adapted to establish a wireless communications link with a first service communications device, the mobile communications device comprising first communications means adapted to communicate with a selected one of the first service communications device and a second service communications device;

first processing means adapted to exchange a first identification key with the corresponding first or second service communications device;

second communications means adapted to communicate with the first communications device via a second communications protocol; and second processing means adapted to generate, based on the first identification key, a second identification key for use during subsequent communications sessions between the user communications device and the first service communications device via the second communications protocol; and first storage means adapted to store the second identification key.

The mobile communications device is characterised in that it further comprises third processing means adapted to authenticate the first communications protocol using a pre-configured trust relation between the mobile communications device and the corresponding first or second service communications device.

As the advantages of the mobile communications device according to the invention and its preferred embodiments correspond to the advantages of the method and its corresponding embodiments described above and in the following, these will not be described again.

The invention further relates to, in a user communications device, a method of establishing a secure communications link between the user communications device and a first service communications device, the method comprising the steps of exchanging a first identification key via a first communications protocol between the user communications device and a selected one of the first service communications device and a second service communications device;

on the basis of the first identification key, generating a second identification key for use during subsequent communications sessions between the user communications device and the first service communications device via a second communications protocol.

The method is characterised in that it further comprises the steps of authenticating the first communications protocol using a pre-configured trust relation between the user communications device and the corresponding first or second service communications device.

The invention further relates to a computer program comprising program code means for performing all the steps of the method described above and below when said program is run on a microprocessor.

The invention further relates to a computer program product comprising program code means stored on a computer readable medium, e.g. a SIM card, for performing the method described above and below when said computer program product is run on a microprocessor.

The invention further relates to an identification key when used as the first identification key in the method described above and in the following. Preferably, the identification key is a shared secret generated by a higher-layer protocol and used for subsequent authentication in the lower-layer communication.

In the following, the invention will be described in connection with the Bluetooth technology. However, it is understood that a person skilled in the art will be able to adapt the invention to other wireless communications technologies.

BRIEF DESCRIPTION OF THE DRAWINGS

The invention will be explained more fully below in connection with preferred embodiments and with reference to the drawings, in which:

FIG. 3a shows a flow diagram of a communications session according to an embodiment of the invention which may be used in connection with the system of FIG. 2a;

FIG. 3b shows a message flow of the communications session of FIG. 3a;

DETAILED DESCRIPTION OF PREFERRED EMBODIMENTS

Figure 1:
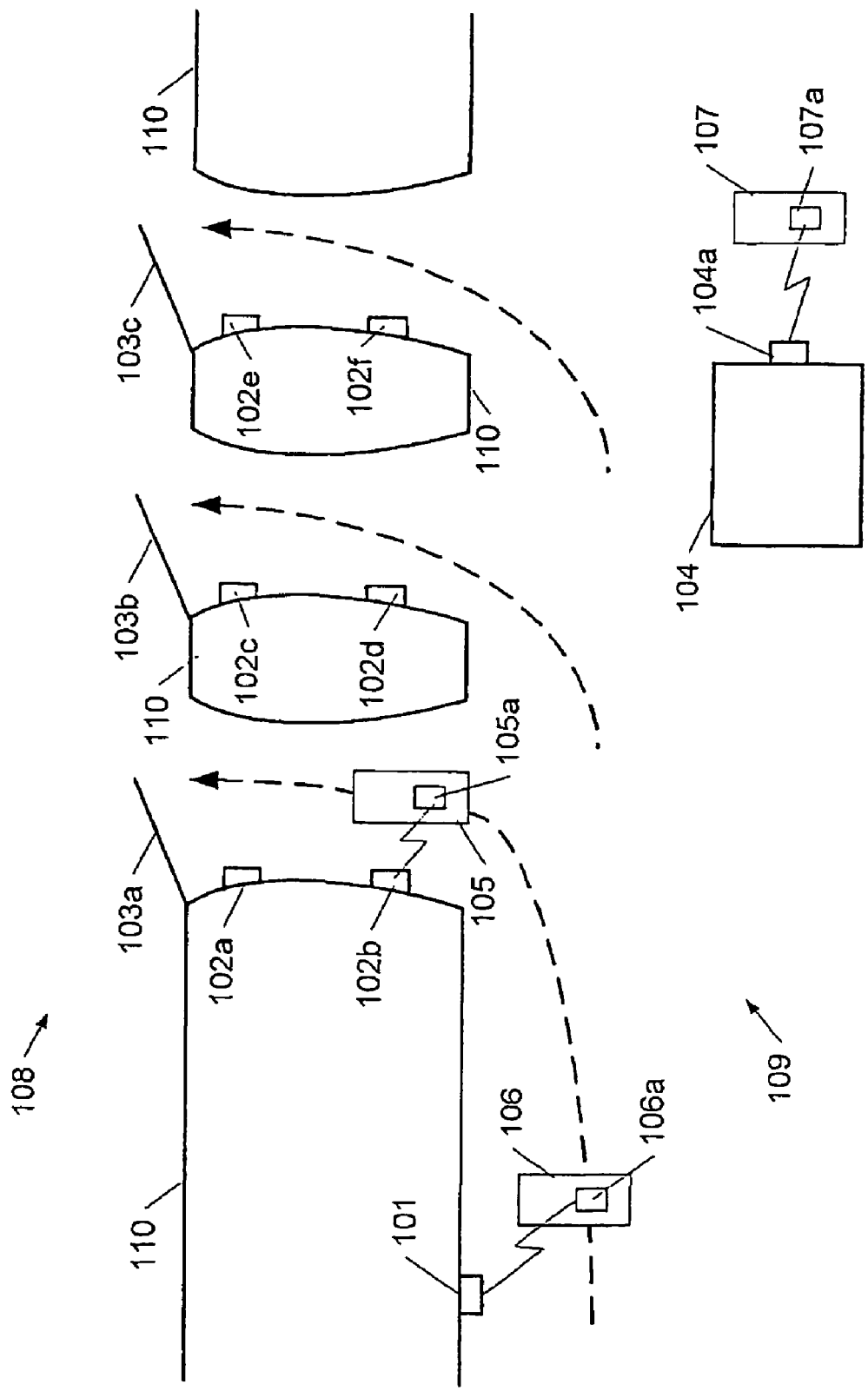
FIG. 1 shows an example of a situation where the method according to the invention may be applied.

FIG. 1 illustrates, as an example of an application of the invention, the use of a Bluetooth mobile phone for public transport ticketing.

In this example, we consider the situation where public transport customers 105–107 have the opportunity to subscribe to a service where they are able to use a mobile phone 105a–107a, respectively, as a user communications device for the storing and presentation of an electronic ticket for the underground transport. A solution using Bluetooth transceivers 102a–f at the underground gates 103a–c as service communications devices is shown in FIG. 1.

Customers 105–107 enter the underground via a lobby area 109 which is separated from the underground platform area 108 by walls 110 with gates 103a–c. Only customers with a valid ticket are allowed to pass through the gates 103a–c.

In the example of FIG. 1, a Bluetooth "pre-scanning" transceiver 101 scans for all Bluetooth units entering the underground area. When the transceiver 101 has established a connection to an approaching Bluetooth unit 106a, information about the approaching unit 106a is forwarded by the transceiver 101 to the transceivers 102a–f at the gates 103a–c. Based on that information, the transceivers 102a–f may page the Bluetooth units that pass the gates, and one of the transceivers 102b may grant access to a Bluetooth unit 105a, if it is authenticated or if it can present a valid electronic ticket over the corresponding Bluetooth link. Hence, this is an example of an application where the time of interaction between the Bluetooth unit 106a and the transceiver 102b should not exceed the time it takes the customer 106 to walk through the gate 103a.

In the example of FIG. 1, a user 107 who arrives in the underground area 109 and who has not yet subscribed to the electronic ticket service, may subscribe to the service by connecting his Bluetooth device 107a to a Bluetooth access point 104 of the service provider via a Bluetooth service device 104a. At the access point 104, the customer 104 may perform a payment transaction, select a desired subscription, and receive a link key. With the link key, the user's Bluetooth device 107a may subsequently establish secure Bluetooth connections with the Bluetooth transceivers 101 and 102a–f.

Figure 2A:
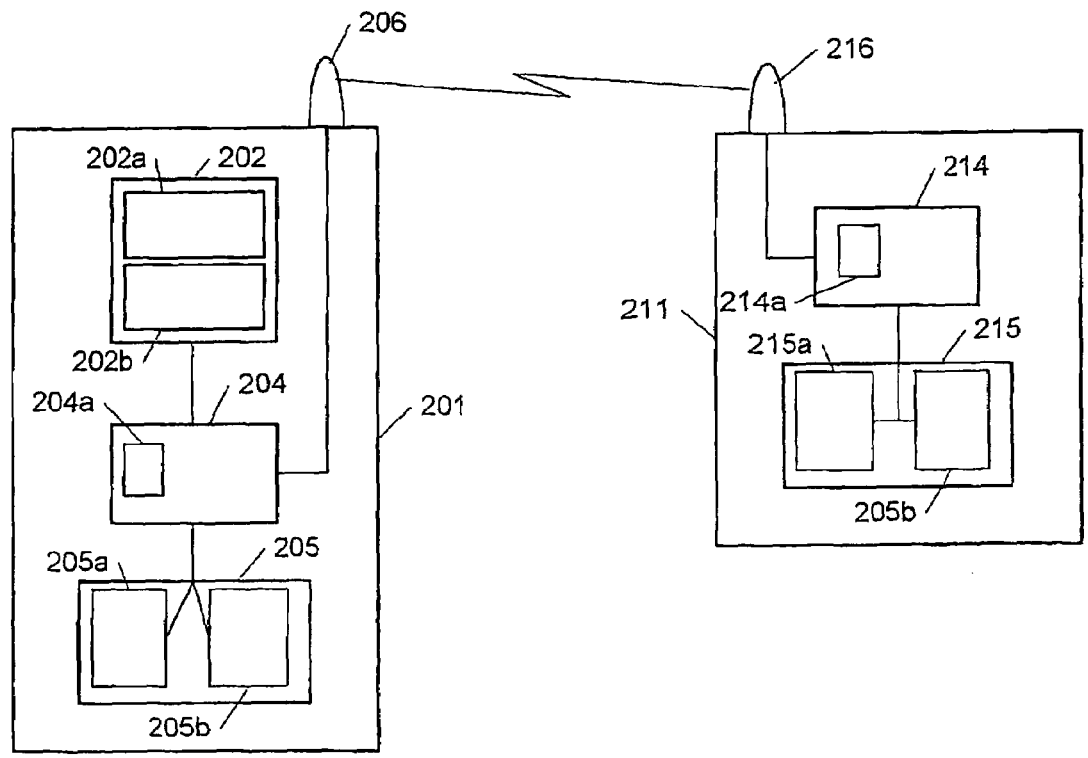
FIG. 2a shows a block diagram of a system according to the invention.

FIG. 2a shows a block diagram of a system according to an embodiment of the invention, comprising a user communications device 201, and a service communications device 211. A user communications device may be standard electronic equipment or part of such electronic equipment, where the term electronic equipment includes computers, such as stationary and portable PCs, stationary and portable radio communications equipment. The term portable radio communications equipment includes mobile stations such as mobile telephones, pagers, communicators, i.e. electronic organisers, smart phones, PDAs, or the like. The user communications device 201 in FIG. 2a comprises a Bluetooth transceiver 206 for connecting the user communications device 201 to the service communications device 211. The transceiver 206 is connected to a microprocessor 204 including a RA 204a. The microprocessor 204 is connected to a memory unit 205 which may comprise a ROM section 205a and an EPROM/EEPROM section 205b. In the ROM section computer-executable program. code is stored which, when loaded in the microprocessor 204, implements the software applications of the device 201, such as the different layers of the Bluetooth protocol and other communications protocols, as will be described in connection with FIG. 2b, security and encryption software, application software for managing service-specific functionality, such as displaying the status of a subscription or the like. In the EPROM/EEPROM section, application data may be stored, such as PIN codes, subscription data, link keys, etc. The memory unit 205 may for example be a SIM card of a mobile phone. The microprocessor 204 is further connected to a user interface unit 202 which comprises a display 202a and a keypad 202b. The display 202a may be used for displaying subscription information, e.g. the number of trips left on the user's account. The keypad 202b may be used for entering PIN codes, selecting different services, acknowledging payments, etc. Alternatively or additionally, the user interface unit 202 may comprise other input means, e.g. a touch screen.

The service communications device 211, e.g. the Bluetooth unit 104a at the service access point 104 shown in FIG. 1, may comprise components similar to the user communications device: a Bluetooth transceiver 216, a processing unit 214 including a RAM 214a, a memory 215 with a ROM section 215a and an EPROM/EEPROM section 215b.

Alternatively or additionally, the service communications device may be connected, e.g. via a LAN, to a server computer executing at least part of the application software, e.g. for the management of link keys, subscription management, etc., and which may provide at least part of the storage capacity of the service communications device, e.g. RAM or another storage medium such as a hard disk.

The service communications device may include its own user interface, or it may be connected to e.g. a separate customer access terminal providing a user interface.

Furthermore, the service communications device may be connected to a network with multiple nodes, e.g. other service communications devices.

Figure 2B:
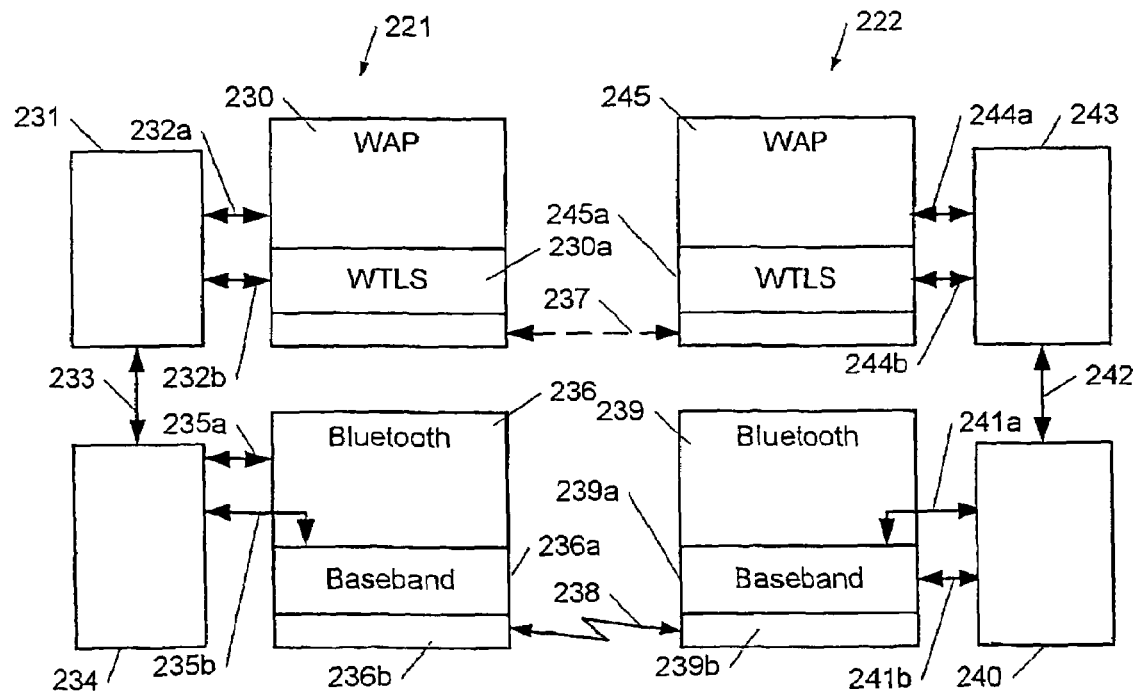
FIG. 2b shows a schematic view of the communications stack of a first embodiment according to the invention.

FIG. 2b shows a schematic view of the communications stack implemented at the user communications device 221 and the service communications device 222 according to an embodiment of the invention. The example illustrated in FIG. 2b corresponds to the exchange of an identification key via a WAP connection with WTLS and the use of that identification key in the pairing of two Bluetooth units. At the user communications device 221, the layers of the WAP stack 230 on top of the Bluetooth stack 236 are shown. The Bluetooth stack 236 includes the baseband 236a which performs the security pairing with the baseband 239a of the Bluetooth stack 239 of the service communications device 222. The actual communications link 238 between the two units 221 and 222 is established at the physical layers 236b and 239b of the respective communications stacks. The Bluetooth security is managed, via the interfaces 235a–b and 241a–b, by the Bluetooth security manager 234 at the user communications device 221 and the security manager 240 at the service communications device 222, respectively.

In order to exchange the identification key or PIN value during the initial communications session, a secure connection 237 is established via WTLS on a WAP bearer. The security at this level is managed by the respective WTLS managers 231 and 243 and their respective interfaces 232a–b and 244a–b to the corresponding WAP stacks 230 and 245, respectively.

When the PIN value is exchanged via the WAP connection 237 it may, according to the invention, be communicated from the WTLS manager 231 at the user communications device 221 to the Bluetooth security manager 234 via the interface 233. Correspondingly, the PIN value may be communicated from the WTLS manager 243 at the service communications device 222 to the corresponding Bluetooth security manager 240 via the interface 242.

FIG. 3a illustrates a flow diagram of a communications session according to a first embodiment of the invention, e.g. between a user communications device and a service communications device as described in connection with FIGS. 2a–b. Initially, in step 301, the user communications device connects, via Bluetooth, to the service communications device, e.g. at a service access 104 shown in FIG. 1. Initially, the Bluetooth connection is established without using any baseband security functions. On top of the Bluetooth connection, a WTLS connection is established in step 302 and a handshake procedure is performed. Alternatively, another higher level protocol, e.g. TLS, may be used for setting up a secure connection. A result of the WTLS handshake protocol is a shared secret 303 or master secret between the client in the user communications device and the server in the service access point. When the secure WTLS connection has been established, additional transactions may be performed in step 304. For example, the server may charge the user, e.g. by requesting credit card information, or it may perform a customer registration procedure. Subsequently, in step 305, the two Bluetooth units perform a baseband secure pairing. The identification key or PIN value 303 used for the pairing is the WTLS master secret or a secure value derived from the master secret. FIG. 3b illustrates the message flow during the communications session described in connection with FIG. 3a. The messages and message sequences between the user communications device 310 and the service communications device 311 are illustrated as horizontal arrows between the two vertical lines 310a and 311a representing the user communications device 310 and the service communications device 311, respectively. After a connection between the user communications device 310 and the service communications device 311 is established by the message sequence 312, a WTLS handshake is performed by the message sequence 313. A result of the WTLS handshake interaction is a shared secret or 'master secret'. At the service communications device 311, the shared secret and a corresponding identifier, e.g. the BD_ADDR of the user communications device, are communicated from the WTLS manager to the Bluetooth security manager via the interface 242 shown in FIG. 2b and stored as a PIN value and corresponding BD_ADDR in a memory or a storage medium 315, e.g. via a function 'store_PIN' 314. At the user communications device 310, the shared secret and a corresponding BD_ADDR are communicated from the WTLS manager to the Bluetooth security manager via the interface 233 shown in FIG. 2b and stored as a PIN value and corresponding BD_ADDR in a memory or a storage medium 317, e.g. via a corresponding function 'store_PIN' 316.

After a secure WTLS handshaking is established a further transaction 318 may be performed. The stored PIN value may be retrieved from the memories or storage media 315 and 317, respectively, via corresponding 'get_PIN' functions 319 and 323. On the basis of the PIN value, an initialisation key may be calculated at the user communications device and the service communications device, respectively. The initialisation key is used during the pairing sequence 321 which comprises unit authentication based on the initialisation key and the generation and exchange of a link key. The link key is stored in the memory or storage media 325 at the user communications device and 327 at the service communications device, respectively, e.g. via respective 'store_key' functions 326 and 328. After this initialisation procedure the user communications device and the service communications device may continue to communicate or disconnect the communications link. In subsequent communications session between the user communications device and the service communications device, unit authentication may be performed directly on the basis of the stored link key without establishing a WTLS handshake, the generation and/or exchange of PIN values and initialisation keys. If encryption is desired, an encryption key may be derived from the link key.

It is understood that instead of using the shared secret resulting from the WTLS handshake procedure as a PIN value, a value derived from that shared secret may be used. Alternatively, the user communications device and/or the service communications device may generate the PIN value independently of the shared secret, and transfer the PIN value to the respective other device over the secure WTLS link.

It is further understood that another secure handshake protocol may be used instead of WTLS, for example the TLS protocol in connection with an IP bearer.

It is further understood that the PIN value may be used as a link key directly, instead of using the PIN value as a basis for the generation of the initialisation key which, in turn, is used during the pairing of the Bluetooth units resulting in a common link key Hence, instead of using the PIN value as an input to the process which generates the initialisation key, the PIN value, or a value derived from it, may be stored directly as a link key in both devices. Hence, in a subsequent session, the existence of the link key will be detected and a pairing of the Bluetooth devices is not necessary.

Figure 4:
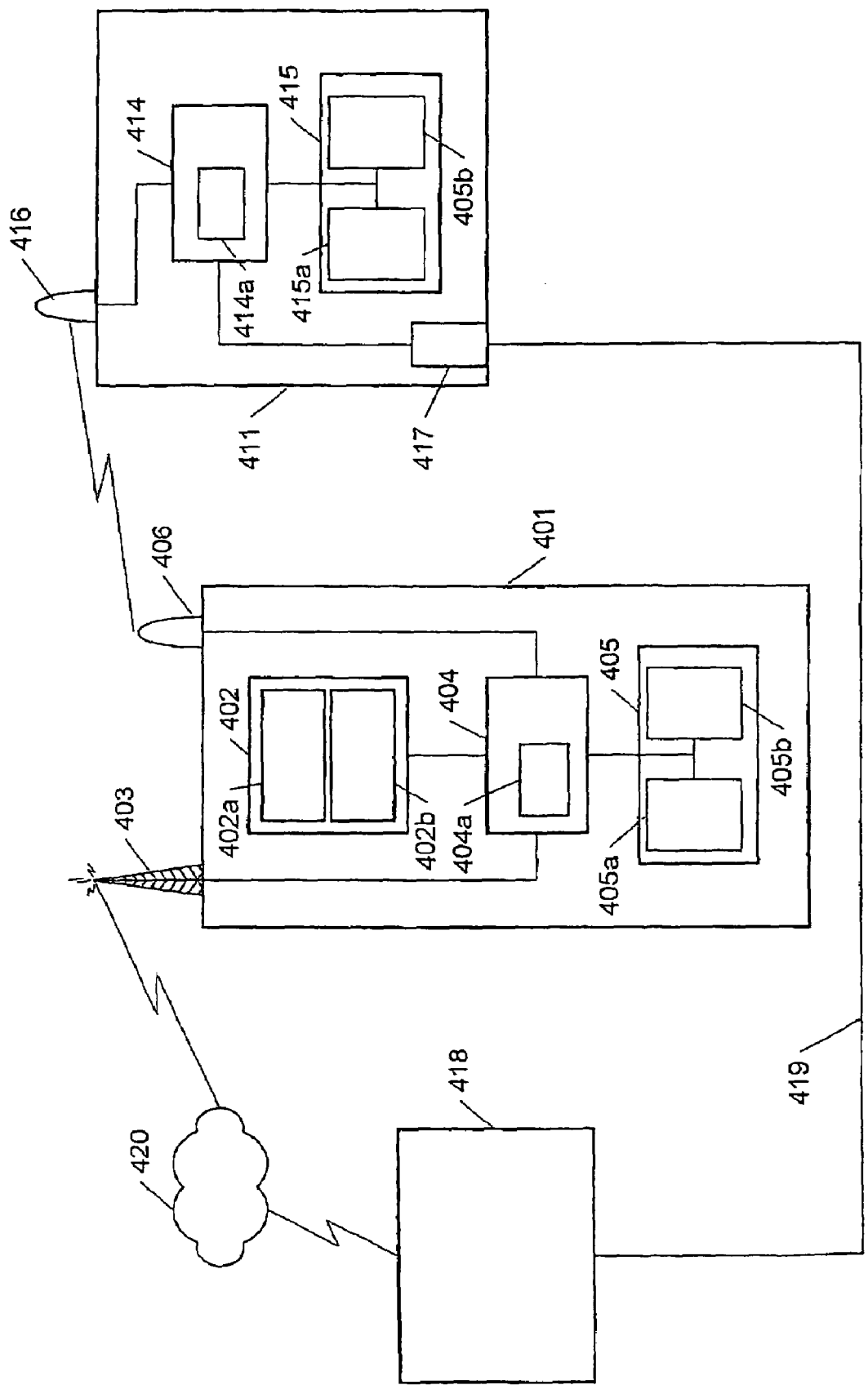
FIG. 4 shows a block diagram of a system according to a second embodiment of the invention.

Now referring to FIG. 4, in a second embodiment of the invention, the system comprises a user communications device 401, a service communications device 411, and a service provider server 418. The user communications device 401 may be standard electronic equipment or part of such electronic equipment as described in connection with FIG. 2a. The user communications device 401 comprises a Bluetooth transceiver 406 for connecting the user communications device 401 to the service communications device 411. The transceiver 406 is connected to a microprocessor 404 including a RAM 404a. The microprocessor 404 is connected to a memory unit 405 which may comprise a ROM section 205a and an EPROM/EEPROM section 405b as described in connection with FIG. 2a. The microprocessor 404 is further connected to a user interface unit 402 which comprises a display 402a and a keypad 402b. The user communications device further comprises a transmit/receive aerial 403 for transmitting and receiving radio signals via a telecommunications network 420. The aerial 403 is connected to the microprocessor 404, and signals received via the aerial 403 are routed to the microprocessor 404, and the microprocessor 404 may initiate and control the transmission of signals via the aerial 403.

The service communications device 411 may comprise components similar to the user communications device: A Bluetooth transceiver 416, a processing unit 414 including a RAM 414a, a memory 415 with a ROM section 415a and an EPROM/EEPROM section 415b. The service communications device 411 further comprises an interface unit 617 for connecting the service communications device to a communications network 419, such as a LAN, a WAN, the Internet, or another suitable communications network.

Alternatively or additionally, as described in connection with FIG. 2a, the service communications device 411 may be connected to a server computer, a customer service terminal, and/or other service communications devices.

Via the aerial 403, the user communications device 401 may communicate, e.g. via a telecommunications network 420 provided by a telecommunications provider, with the service provider server 418. The user communication device 401 and the service provider server 418 may establish a secure connection, e.g. via WTLS or TLS, and exchange a PIN value. The PIN value may be transferred from the service provider server 418 via the communications network 419 to the service communications device 411.

It is understood that the communication between the user communications device and the service provider server may be established via other communications means. For example, the user communications device may be connected to a computer, e.g. via a serial port such as an IrDa port, and the computer may communicate with the service provider server via the Internet. Hence, the PIN value may be exchanged between the computer and the service provider server and subsequently transferred from the computer to the user communications device. In another embodiment, the user communications device may comprise a network interface for connecting the user interface to a LAN such that the user communications device may connect to the Internet via a web server on the LAN.

Figure 5A:
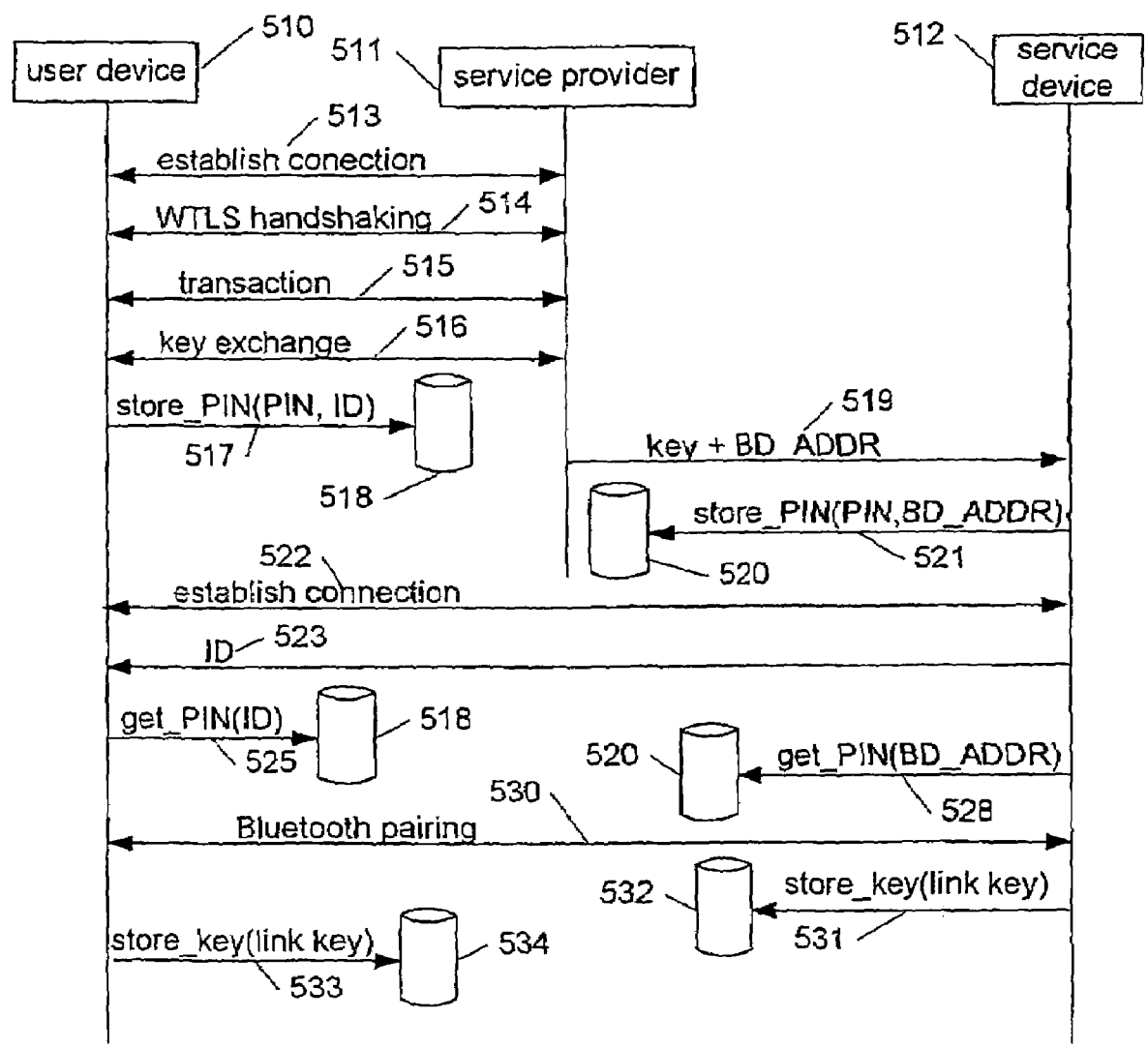
FIG. 5a shows a first example of a message flow of a communications session according to an embodiment of the invention which may be used in connection with the system of FIG. 4.

FIG. 5a illustrates a first example of a message flow during a communications session according to an embodiment of the invention which may be used in connection with the system of FIG. 4. Initially, a communications link, e.g. via a telecommunications network and WAP, between the user communications device 510 and the service provider 511 is established by the message sequence 513. Via the subsequent message sequence 514, a WTLS handshake is performed. A result of the WTLS handshake interaction is a shared secret or 'master secret'. After the handshake and a possible further key exchange 516, the shared secret, or another secret PIN value generated during the WTLS session, is available both at the user communications device 510 and the service provider 511. Furthermore, the user communications device receives a service identifier identifying the service to which the user has subscribed. Preferably, the service provider receives the Bluetooth device address (BD_ADDR) of the user communications device. At the user communications device, the shared secret is communicated from the WTLS manager to the Bluetooth security manager and stored as a PIN value, together with the service identifier, in a memory or a storage medium 518, e.g. via a corresponding function 'store_PIN' 517. The PIN value and the BD_ADDR may be transmitted from the service provider 511 to the service communications device 512, e.g. via the network 419 in FIG. 4. In the service communications device 512, the PIN value and the BD_ADDR are stored in a memory or a storage medium 520, e.g. via a 'store_PIN' function 521. The communications link between the user communications device 510 and the service provider 511 may be closed, or the communication may be continued in order to perform other transactions.

In a subsequent communications session, e.g. in the example of FIG. 1, when a user enters the underground lobby for the first time after having subscribed to an e-ticket service via the Internet, the user communications device 510 and the service communications device 512 establish, during interaction 522, a Bluetooth connection. During a service discovery sequence 523, the user communications device 510 receives the service identifier from the service communications device 512. Based on the service identifier, the user communications device 510 may, in step 525, retrieve the PIN value from the memory or storage medium 518. In step 528, based on the BD_ADDR of the user communications device, the service communications device 512 may retrieve the PIN value from its memory or storage medium 520. On the basis of the PIN value, the user communications device and the service communications device 512 may now perform a secure baseband pairing 530 and, as described in connection with FIG. 3b, store the resulting link key in their respective memories or storage media 532 or 534. After this initialisation procedure the user communications device 510 and the service communications device 512 may continue to communicate or disconnect the communications link. In a subsequent communications session between the user communications device 510 and the service communications device 512, the unit authentication may be performed directly on the basis of the stored link key without establishing a WTLS handshake, generating and/or exchanging PIN values or initialisation keys. If encryption is desired, an encryption key may be derived from the link key.

It is understood that another secure handshake protocol may be used instead of WTLS, for example the TLS protocol in connection with an IP bearer.

Figure 5B:
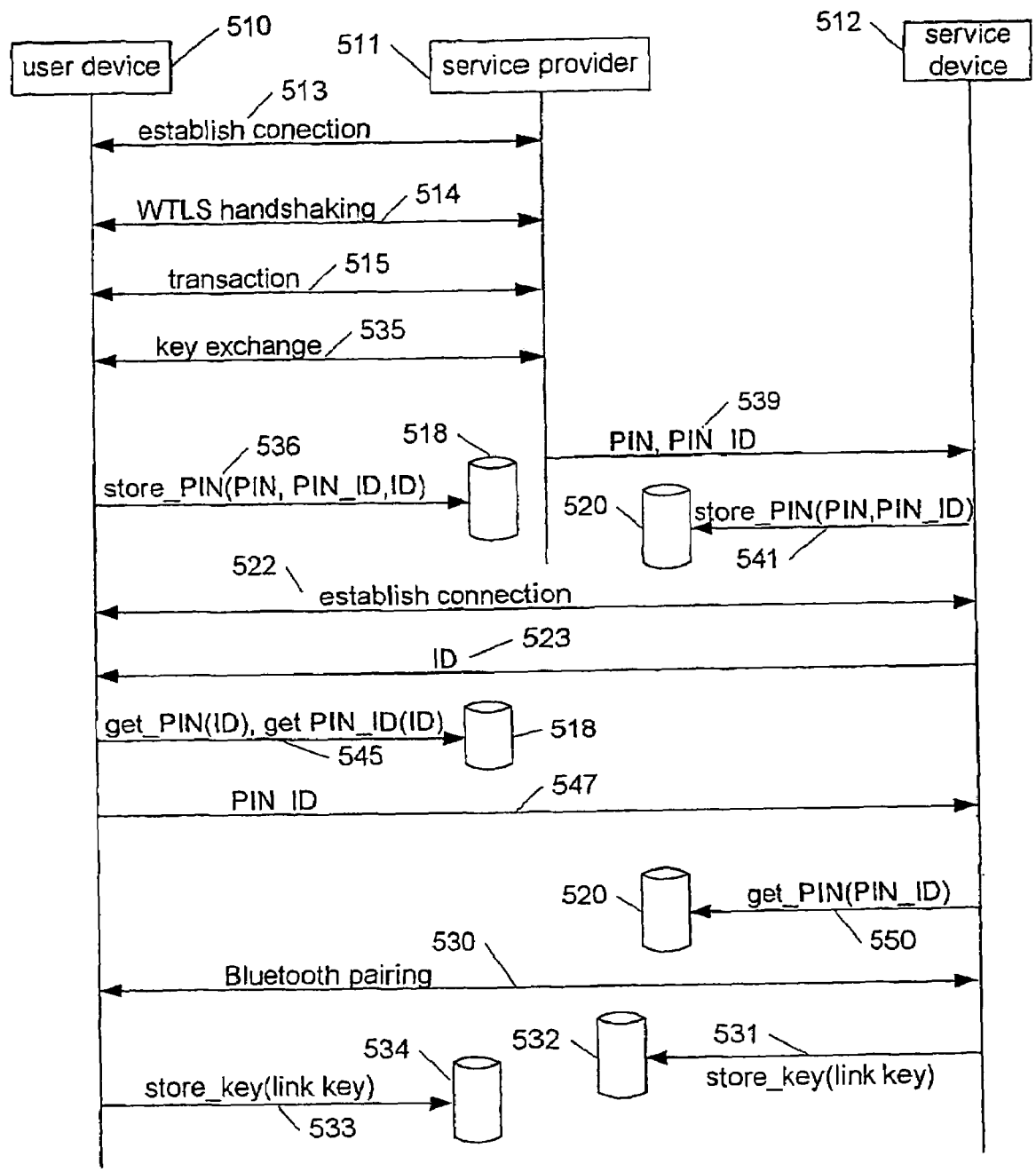
FIG. 5b shows a second example of a message flow of a communications session according to an embodiment of the invention which may be used in connection with the system of FIG. 4.

FIG. 5b illustrates a second example of a message flow during a communications session according to an embodiment of the invention which may be used in connection with the system of FIG. 4. Like in the example of FIG. 5a, a secure WTLS connection is established (transaction 513 and 514) between the user communications device 510 and the service provider 511. A subscription transaction 515 may be performed and a PIN value as well as a service identifier is exchanged in a key exchange sequence 535. According to this embodiment of the invention, an additional PIN identifier is generated and exchanged during the key exchange sequence 535. During sequence 539, the PIN value and the PIN identifier are transferred to the service communications device 512 and, in step 541, stored in the memory or storage medium 520. At the user communications device 510, the PIN value, the service ID and the PIN identifier are stored in the memory or storage medium 518, in step 536.

Subsequently, in step 522, a Bluetooth connection between the user communications device 510 and the service communications device 512 is established as described in connection with the example of FIG. 5a, and a service discovery sequence 523 is performed. At the user communications device, the PIN value and the PIN identifier are retrieved from the memory or storage medium 518, in step 545, based on the service identifier. During the message sequence 547, the PIN identifier is transmitted to the service communications device 512 which may subsequently retrieve the PIN value from its memory or storage medium 520, in step 550. Once the PIN value is available at the user communications device 510 and the service communications device 512, the Bluetooth pairing 530 and the storage of the resulting link key may be performed as described in connection with FIG. 5a.

The invention claimed is:

1. A method of establishing a secure communications link between a user communications device and a first service communications device, the method comprising the steps of:
   exchanging a first identification key via a first communications protocol between the user communications device and a selected one of the first service communications device and a second service communications device;
   generating, based on the first identification key, a second identification key for use during subsequent communications sessions between the user communications device and the first service communications device via a second communications protocol;
   storing the second identification key in a first storage means of the user communications device and in a second storage means of the first service communications device;
   characterised in that the method further comprises the step of
   authenticating the first communications protocol using a pre-configured trust relation between the user communications device and the corresponding first or second service communications device; and
   characterised in that
   the step of exchanging the first identification key further comprises the steps of establishing a communications link between the user communications device and the second service communications device, and generating and storing in a third storage means of the user communications device an identification code related to the first identification key;
   the method further comprises the step of communicating the first identification key and the identification code from the second service communications device to the first service communications device; and
   the step of generating the second identification key further comprises the steps of transmitting the identification code from the first service communications device to the user communications device, and, on the basis of the identification code, retrieving the first identification key from the first storage means.

2. A method according to claim 1, characterised in that the communications link uses a protocol selected from the class of protocols comprising TCP/IP and WAP.

3. A communications system comprising:
   a user communications device and a first service communications device,
   the user communications device including:
   first communications means adapted to communicate via a first communications protocol with a selected one of the first service communications device and a second service communications device;

first processing means adapted to exchange a first identification key with the corresponding first or second service communications device;

the user communications device and the first service communications device including:

respective second and third communications means adapted to communicate via a second communications protocol; and respective second and third processing means adapted to generate, based on the first identification key, a second identification key for use during subsequent communications sessions between the user communications device and the first service communications device via the second communications protocol; and respective first and second storage means adapted to store the second identification key;

characterised in that the user communications device further comprises fourth processing means adapted to authenticate the first communications protocol using a pre-configured trust relation between the user communications device and the corresponding first or second service communications device, and characterised in that the first communications means is adapted to establish a communications link with the second service communications device;

the first processing means is further adapted to exchange an identification code related to the first identification key with the second service communications device;

the user communications device further comprises third storage means adapted to store the first identification key and the identification code;

the first communications means comprises fourth communications means adapted to receive the first identification code from the second service communications device; and the second processing means is adapted to retrieve the first identification key from the first storage means, on the basis of the received identification code.

4. A communications system according to claim 3, characterised in that the communications link uses a protocol selected from the class of protocols comprising TCP/IP and WAP.

5. In a user communications device, a method of establishing a secure communications link between the user communications device and a first service communications device, the method comprising the steps of:

exchanging a first identification key via a first communications protocol between the user communications device and a selected one of the first service communications device and a second service communications device;

on the basis of the first identification key, generating a second identification key for use during subsequent communications sessions between the user communications device and the first service communications device via a second communications protocol;

characterised in that the method further comprises the steps of authenticating the first communications protocol using a pre-configured trust relation between the user communications device and the corresponding first or second service communications device; and characterised in that the step of exchanging the first identification key further comprises the steps of establishing a communications link to the second service communications device, and storing in a first storage means an identification code related to the first identification key, the identification code further being made available at to the first service communications device;

the step of generating the second identification key further comprises the steps of receiving the identification code from the first service communications device, and, on the basis of the identification code, retrieving the first identification key.

6. A method according to claim 5, characterised in that the second communications link uses a protocol selected from the class of protocols comprising TCP/IP and WAP.

* * * * *

UNITED STATES PATENT AND TRADEMARK OFFICE
CERTIFICATE OF CORRECTION

PATENT NO. : 7,216,231 B2 Page 1 of 1
APPLICATION NO. : 10/467511
DATED : May 8, 2007
INVENTOR(S) : Gehrmann It is certified that error appears in the above-identified patent and that said Letters Patent is hereby corrected as shown below:

On the Title Page Item (73), under "Assignee", Line 1, delete "L M" and insert -- LM --, therefor.

In Column 2, Line 36, after "which" delete "my" and insert -- may --, therefor.

In Column 9, Line 21, delete "RA" and insert -- RAM --, therefor.

In Column 10, Line 53, delete paragraph "FIG. 3b illustrates..........'store_PIN' 316." and insert the same as a new paragraph in column 10, line 54.

Signed and Sealed this

Fifteenth Day of July, 2008

JON W. DUDAS
*Director of the United States Patent and Trademark Office*